United States Patent
Park et al.

(10) Patent No.: US 7,940,734 B2
(45) Date of Patent: May 10, 2011

(54) MOBILE COMMUNICATION SYSTEM HAVING RADIO ACCESS NETWORK AND METHOD CONTROLLING CALL PROCESSING LOAD THEREOF

(75) Inventors: Ji-Soo Park, Daejeon (KR); Moon-Soo Jang, Daejeon (KR); In-Seong Park, Daejeon (KR); Pyeong-Jung Song, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 993 days.

(21) Appl. No.: 11/722,302

(22) PCT Filed: May 17, 2005

(86) PCT No.: PCT/KR2005/001434
§ 371 (c)(1),
(2), (4) Date: Jun. 20, 2007

(87) PCT Pub. No.: WO2006/068353
PCT Pub. Date: Jun. 29, 2006

(65) Prior Publication Data
US 2010/0003999 A1    Jan. 7, 2010

(30) Foreign Application Priority Data
Dec. 20, 2004   (KR) .................. 10-2004-0109021

(51) Int. Cl.
*H04W 4/00* (2009.01)
(52) U.S. Cl. ....................................... 370/338; 455/453
(58) Field of Classification Search .................. 370/328, 370/329, 332, 338, 341; 455/450, 452.2, 455/453, 456.2, 464
See application file for complete search history.

(56) References Cited

U.S. PATENT DOCUMENTS

| | | | |
|---|---|---|---|
| 7,230,937 B2 * | 6/2007 | Chi et al. | 370/329 |
| 7,440,744 B2 * | 10/2008 | Muniere et al. | 455/403 |
| 2004/0043771 A1 | 3/2004 | Shin | |

FOREIGN PATENT DOCUMENTS

| | | |
|---|---|---|
| EP | 1418782 A1 | 5/2004 |
| KR | 1020010094362 | 11/2001 |
| KR | 1020020034530 | 5/2002 |
| KR | 1020020054559 | 7/2002 |
| KR | 100420917 | 7/2003 |

OTHER PUBLICATIONS

International Search Report; PCT/KR/2005/001434; Apr. 26, 2006.
Written Opinion of the International Searching Authority; PCT/KR2005/001434; Apr. 26, 2006.
All the references cited in the Search Report are listed above.

* cited by examiner

*Primary Examiner* — Ricky Ngo
*Assistant Examiner* — Kan Yuen
(74) *Attorney, Agent, or Firm* — Kile Park Goekjian Reed & McManus PLLC

(57) ABSTRACT

A mobile communication system structured in a radio access network having a base station, a control station, and a switch network for matching a mobile station and a core network, the control station comprising a traffic signal process; a control signal processor; a call process load controller; and a call processor, wherein the call process load controller refers to information on call process volume included in a call process volume request message sent from the call processor and the traffic signal processor, selects the corresponding call processor and traffic signal processor according to weight estimated based on software and hardware performance, and sends the call control service request message containing information on the selected traffic signal processor to the selected call processor.

24 Claims, 14 Drawing Sheets

MOBILE COMMUNICATION SYSTEM HAVING RADIO ACCESS NETWORK AND METHOD CONTROLLING CALL PROCESSING LOAD THEREOF

TECHNICAL FIELD

The present invention relates to a mobile communication system having a radio access network.

BACKGROUND ART

Emergence of a complex mobile multimedia environment in the current mobile communication system is beyond the capability of present technology and transmission of traffic needs to be managed in a broadband network since users have been demanding more various multimedia services thereby resulting in an increase of information. Consequently, guidelines have been issued on efficient use of massive radio resource information by controlling the resources at high speed so as to offer mobile communication multimedia services. However, a high load of call processes for calls requesting radio access for various multimedia services from mobile users are not reliably processed. Moreover, a mobile communication system has been developed without considering a system environment for call processes, for example, whether systems processing the calls have identical or different hardware and software performances from each other.

In this situation, definition and analysis of an appropriate management policy for radio resource allocation will be very important for a mobile communication system in the $2^{nd}$, $3^{rd}$, and generations beyond. Further, desired quality of services, maintenance of planned serviceable areas and high system capacity must be guaranteed.

Currently, a plurality of call processors logically process calls from mobile stations and from a core network or another control station in an associated control station of the mobile communication system. In other words, the call processors receive a call control service request from the mobile station through connection to a plurality of base stations, and receive the call control service request from the core network through upper services which include session control, call control, mobility control, and additional service control. However, in the control station of the conventional mobile communication system, a plurality of call processors are inefficiently operated since the call process service is offered by a predetermined call processor. Further, a system fault may occur due to operating congestion when the processes of the calls are overloaded to a predetermined call processor, thereby increasing unreliability of the system.

Recently, load distribution in the radio access call process according to call control service requests has been studied, and Korean Patent Publication No. 404876 disclosed load distribution of a call processor and a method thereof. However, the disclosed technology restricts features of call process performance to a traffic process. In particular, the disclosed technology checks a threshold value of overload of the call processor so as to prevent the call processor from being overloaded.

Consequently, such a conventional technology cannot satisfy the multimedia service users requesting priority-based quality of services. Further, fair distribution of the call processes is impaired since performance of respective devices in the system does not involve measuring weight values of the devices during maintenance or upgrade procedures of the system. Therefore, uneven distribution of the call processes to the respective devices which have different performance capabilities causes the respective device to be inefficient managed, thereby increasing unreliability thereof.

DISCLOSURE OF INVENTION

Technical Problem

The present invention is purposed to provide a mobile communication system having devices processing control and traffic calls in a RAN and a method for controlling call processing load of the devices to evenly distribute call processing load to respective devices and to process a call having the highest priority among priority-based quality of service (QoS) calls.

Technical Solution

The present invention discloses a mobile communication system having a radio access network including a base station, a control station, and a switch network for matching a mobile station and a core network. The control station includes a radio layer 2 traffic signal processor (hereinafter, referred to as a traffic signal processor); a radio layer 2 control signal processor (hereinafter, referred to as a control signal processor); a call process load controller; and a radio layer 3 call processor (hereinafter, referred to as a call processor). The traffic signal processor is connected to the base station, shares radio resources, and processes traffic calls. The control signal processor receives call control service request messages sent from the mobile station through the base station. The call process load controller receives the call control service request messages respectively sent from the mobile station and the core network through the control signal processor, and processes the control process service request messages. The call processor distributes and allocates resources for control and traffic calls to the control signal processor, the traffic signal processor, and the base station in accordance with the call control service request message sent from the call process load controller. The call process load controller refers to information on a call process volume included in a call process volume request message sent from the call processor and the traffic signal processor, selects the corresponding call processor and traffic signal processor according to weight values of the call processor and the traffic signal processor estimated based on software and hardware performance of the call processor and the traffic signal processor, and sends the call control service request message containing information on the selected traffic signal processor to the selected call processor.

The call process load controller includes a message processor and a call control scheduler. The call process load controller receives the call control service request messages sent from the core network and the mobile station via the control signal processor, stores the message in a class queue according to a quality of service-based priority, registering call process volume report messages sent from the call processor and the traffic signal processor in a list of call processing load rates, and controls timers set for the call processor and the traffic signal processor. The call control scheduler receives a queued event message from the message processor, selecting a call processor and a traffic signal processor according to priority of the class queue, and sends the call control service request messages to the selected call processor.

The present invention discloses a method for controlling a load of call processes in a mobile communication system having a radio access network including a base station, a control station (herein, the control station includes a traffic signal processor, a control signal processor, a call process load controller, and a call processor), and a switch network for matching a mobile station and a core network.

In the method, a) the call process load controller receives a call control service request message from the mobile station or the core network, b) the call process load controller selects a corresponding call processor and a corresponding traffic signal processor according to weight value of the call processor and the traffic signal processor on the basis of call process volume information included in the call process volume request message sent to the call process load controller; c) the call process load controller sends the call control service request message to the selected call processor; and d) the selected call processor which has received the call control service request message allocates resources to the base station, the control signal processor, and the traffic signal processor, and processes the corresponding call control service.

Advantageous Effects

According to the embodiments of the present invention, a mobile communication system can be stably and efficiently operated by distributing a call processing load to respective devices based on their software and hardware performance, and processing a call control request having highest priority by offering QoS-based classes to thereby reduce delay in processing the earliest call.

BEST MODE FOR CARRYING OUT THE INVENTION

Figure 1:
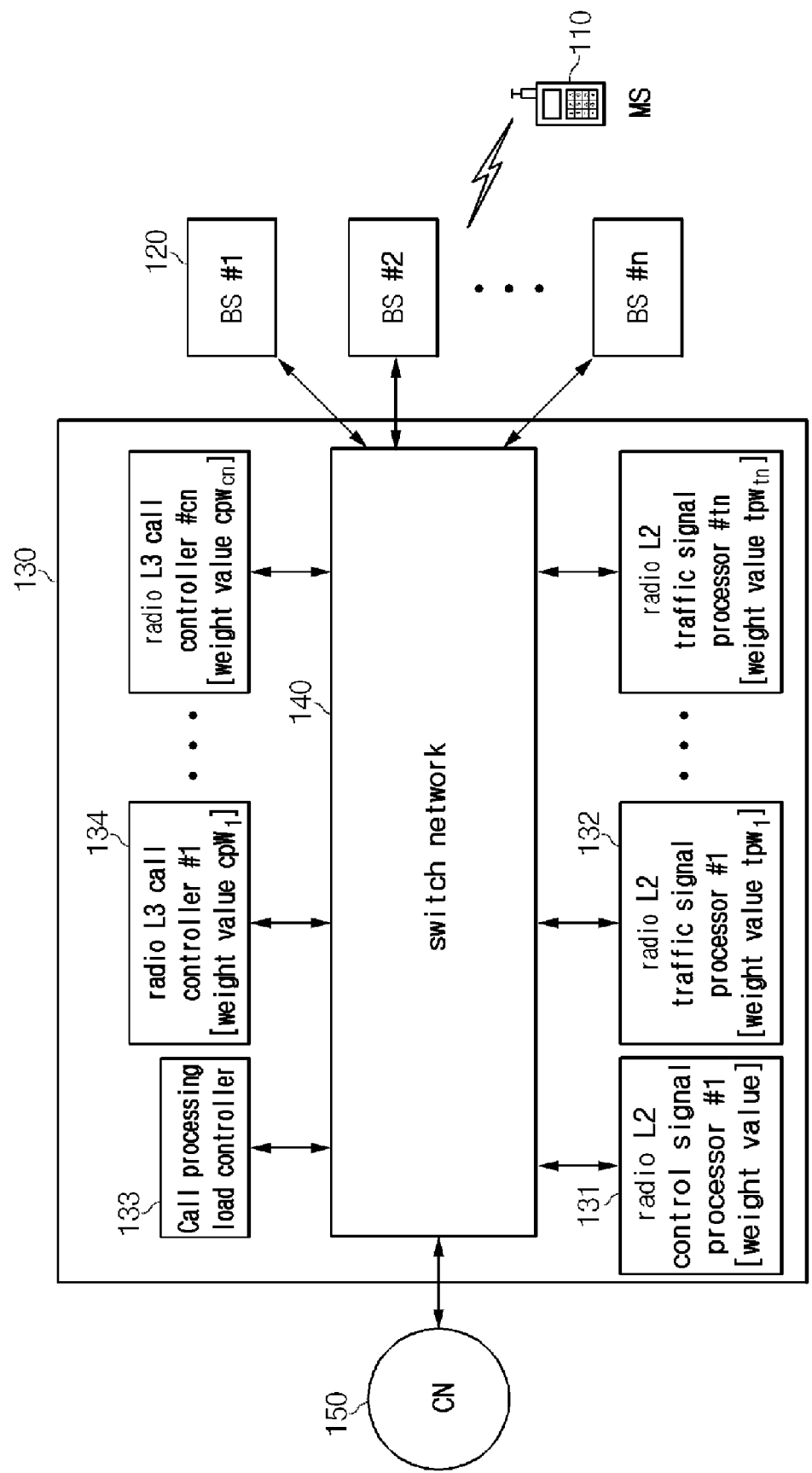
FIG. 1 shows a configuration of a radio access network (RAN) of a mobile communication system according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Referring to FIG. 1, a configuration of a radio access network for a mobile communication system to which the present invention is employed will be described hereinafter.

FIG. 1 shows a configuration of the radio access network of the mobile communication system to which the present invention is employed.

As shown therein, the mobile communication system according to an embodiment of the present invention is structured as a radio access network (RAN) having a base station (BS) 120 for matching a mobile station (MS) 110 and a core network (CN) 150, a control station (CS) 130, and a switch network (SN) 140.

With this configuration, the mobile communication system according to the embodiment of the present invention further includes a transceiver supporting wireless access of the MS 110 when a user wants to access a mobile service by accessing a stationary local wireless network through the MS 110. The transceiver processes a radio frequency (RF) signal of wireless data, and demodulates an intermediate frequency (IF) data signal to a baseband signal (data signal). In addition, the transceiver transmits the data signal to the CS through an associated channel so as to route the data to an associated destination.

The mobile communication system has a processor for an opposite direction. The processor allocates and manages local stream and radio resources for a stationary RAN by using the BS 120 to perform a traffic process for radio resource allocation (i.e., channel allocation from the CS 130) and a plurality of radio layer 3 call processors (hereinafter referred to as a call processor) 134.

The call processors 134 process call control services between MSs, between the MSs and other control stations, or between the MS and the CN 150, and provide a radio call access function to guarantee mobility of the MS to BSs on the basis of a radio call access protocol installed in the call processor 134.

The CS 130 receives request messages from the MS 110 and the CN 150. The MS 110 requests a call control service for radio access through a plurality of BSs 120 from the CS 130, and the CN 150 requests a call control service for radio access with the MS 110 through upper services, for example, session control, call control, mobility control, and addition service control. The CS 130 performs a call process service for control signals and traffic signals through more than one call processor 134 and radio layer 2 traffic signal processor (hereinafter referred to as traffic signal processor) respectively having similar or different performance-based weight values.

The call control service request message sent to the CS 130 includes multimedia calls, an emergency call having the highest priority, control signals having higher and lower priorities, and registration and deregistration of the MS 110, the multimedia calls including a conversational call for exchanging voice data in real time, a streaming call in real time, an interactive call in real and non-real time, and a background call for data having the lowest priority, etc. Each of the calls includes various messages in accordance with origination and termination of the call.

Herein, the call control service request message according to the embodiment of the present invention considers origination of various multimedia calls, mobility control in consequence to registering/deregistering a location of the MS, a session setting according to a session control, and an additional service request. In addition, it is assumed that termination of a call and a request service for session delete are processed by a predetermined call processor in accordance to processing methods employed in the embodiment of the present invention.

The switch network 140 has more than one switch capable of switching a baseband asynchronous transfer mode (ATM) cell containing a destination address, routing traffic data, and control signal data in internet protocol (IP) packet data, and transmitting and switching the ATM or IP data packet. Further, the switch network 140 maintains a logical and physical connection between a call process load controller 133, a call processor 134, a control signal processor 131, a traffic signal processor 132, the BS 120, and the CN 150 in a mesh network.

Figure 2:
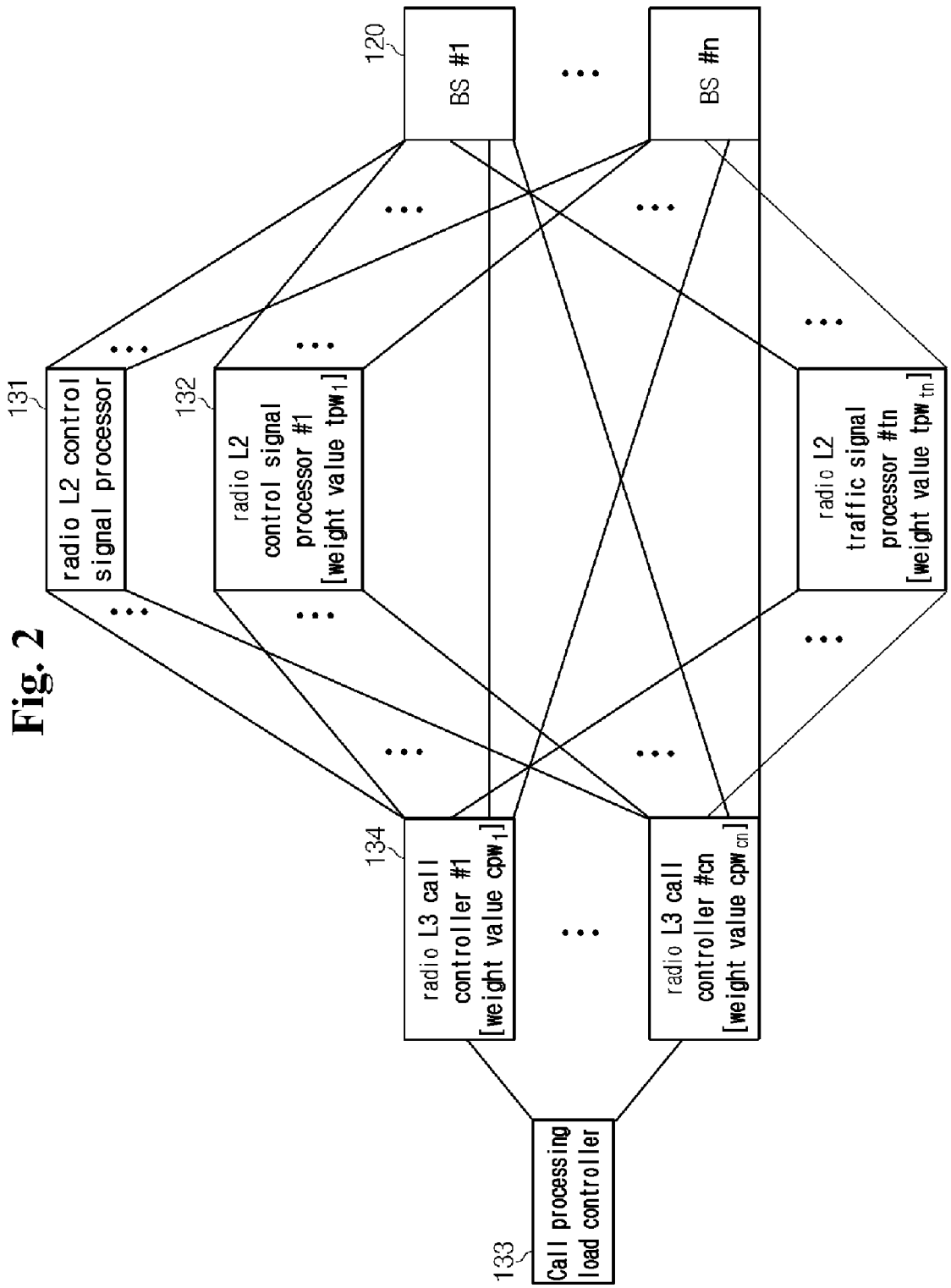
FIG. 2 shows a connection between function-specific devices and a base station serviced by a CS in the RAN according to the embodiment of the present invention.

FIG. 2 depicts a relationship between functional devices of the CS 130, traffic signal processor 132, call process load controller 133, and call processor 134 and the BS 120 in a RAN.

As shown in FIG. 2, the call process load controller 133 is logically and physically connected to the call processor 134 and the traffic signal processor 132, the call processor 134 maintains a logical and physical relationship between the control signal processor 131, the traffic signal processor 132, and the BS 120 in the mesh network, and the call process load controller 133 is logically and physically connected to the control signal processor 131 and a call control service requestor of the CN 150, the call control signal processor 131 performing a final transmission of a call control service request message from the BS 110.

Accordingly, a call control service request message requiring a radio access service is transmitted to the call processor 134 through the call process load controller 133. The call processor 134 performs request-specific processes for the received call control request message, and distributes resources for control and traffic calls and allocates the distributed resources to the control signal processor 131, traffic signal processors 132, and the BS 120.

Herein, the devices are logically and physically connected to each other by the switch network 140, as shown in FIG. 1. The MS 110 and the BS 120 in the RAN are connected through a radio link for a radio control signal channel and a radio traffic signal channel.

The respective call processors 134 are connected to the BSs of the CS 130 in the mesh network such that associated channels are allocated to the BSs 120 in accordance with the call control service request messages. The call processor 134 and the traffic signal controller 132 respectively perform corresponding call processes (i.e., channel allocation) for the BSs 120 connected to the CS 130 regardless of a location of the MS 110 served by the BS 120.

Figure 3:
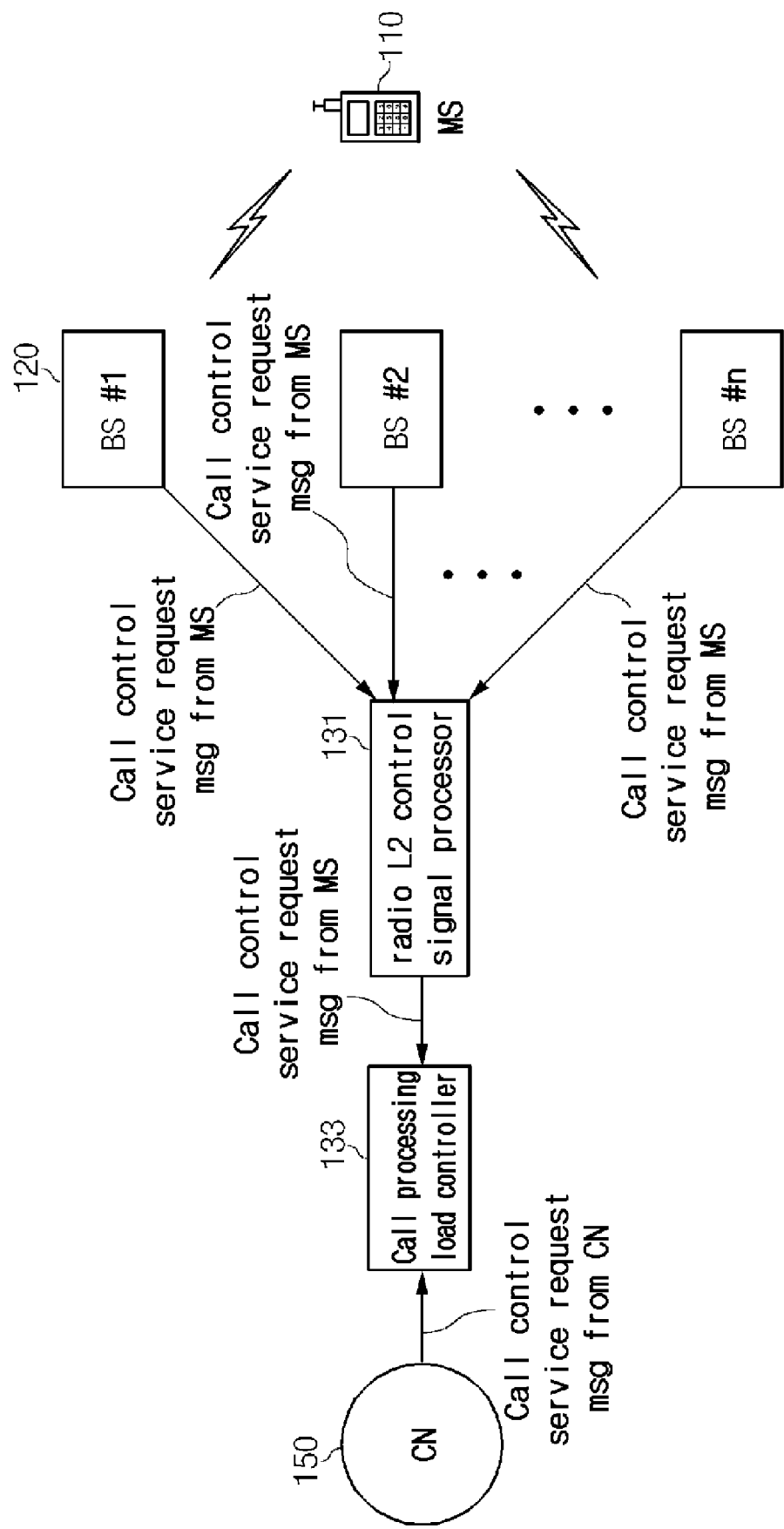
FIG. 3 depicts a functional flow for a call control service request of the RAN according to the embodiment of the present invention.

Referring to FIG. 3, a call control service requesting functionality of the RAN according to an embodiment of the present invention will be described.

Figure 4:
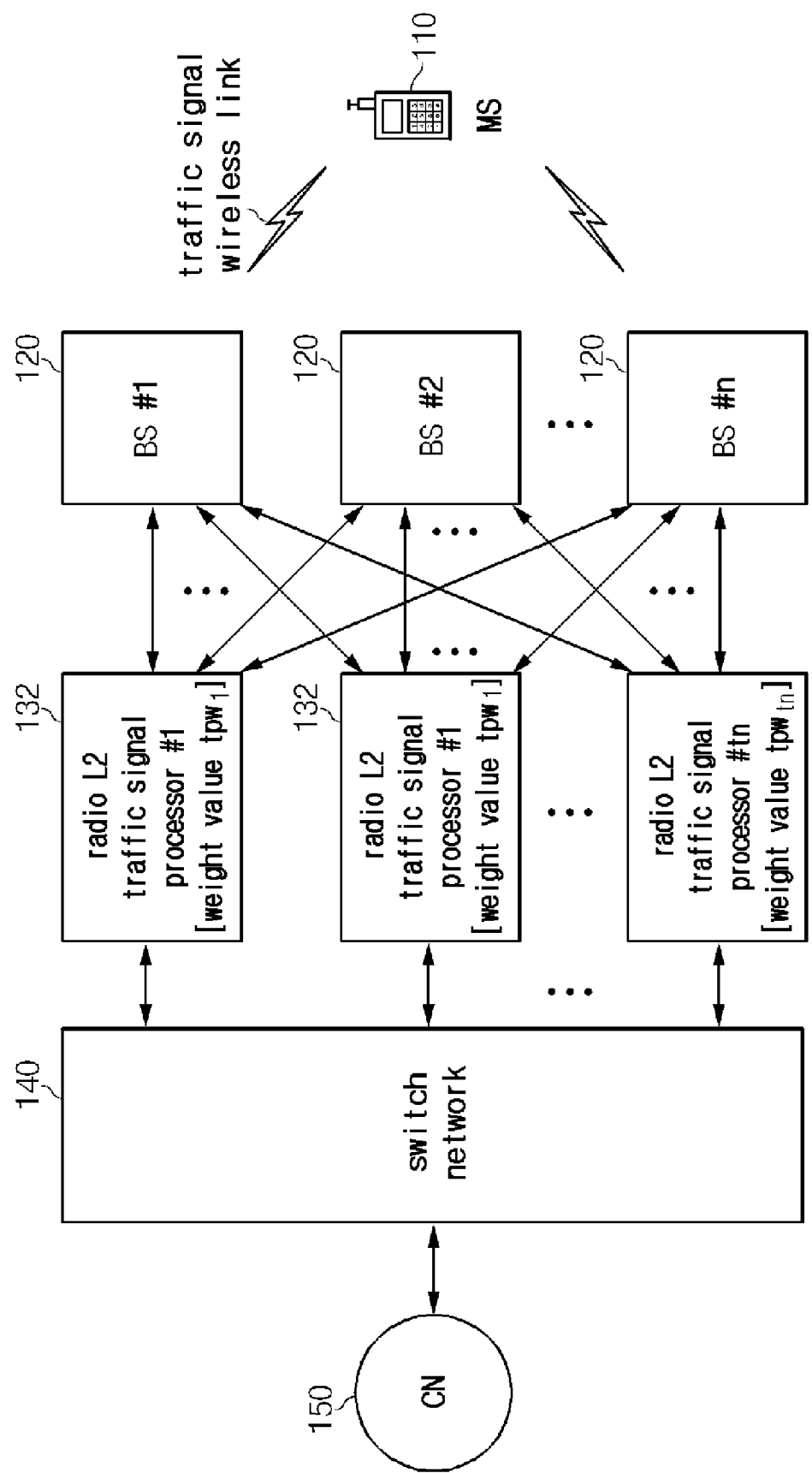
FIG. 4 depicts a functional block diagram configuring a path of a traffic call of the RAN according to the embodiment of the present invention.

FIG. 3 and FIG. 4 depict functional flows of the call control service request functionalities of the RAN according to an embodiment of the present invention.

As shown in FIG. 3, a plurality of MSs 110 as a requester of the call control service send call control service request messages to the control signal processor 131 requesting that a radio control signal channel between the MS and the BS for radio access through a radio link, and the control signal processor 131 sends the call control service request message to the call process load controller 133. In addition, a call control service request message from the CN 150 is sent to the call process load controller 133 by a call control service requester in the CN 150.

The call process load controller 133 which has received the call control service request message selects a call processor 134 and a traffic signal processor 132 which have a minimum load rate of call control processes in accordance with call control process volume report messages of the respective call processors 134, the report messages including the volume of call control processes, load rates of call control process in accordance with quality of service (QoS)-based class, and performance weight values of the respective devices. Further, the call process load controller 133 selects a traffic signal processor 132, and transmits a call control service request to the selected call processor 134.

The call processor 134 which has received the call control service request allocates radio resources to the selected traffic signal processor 132 and the BS 120 in which the MS are located so as to establish a traffic path by performing the radio access service to the MS 110 as shown in FIG. 4. Herein, the amount of allocated radio resources corresponds to a requested amount of traffic calls for radio access.

As described, the traffic signal processors 132 and BSs 120 form the mesh network such that the traffic signal processors 132 and corresponding MSs 120 may share the radio resources.

Figure 5:
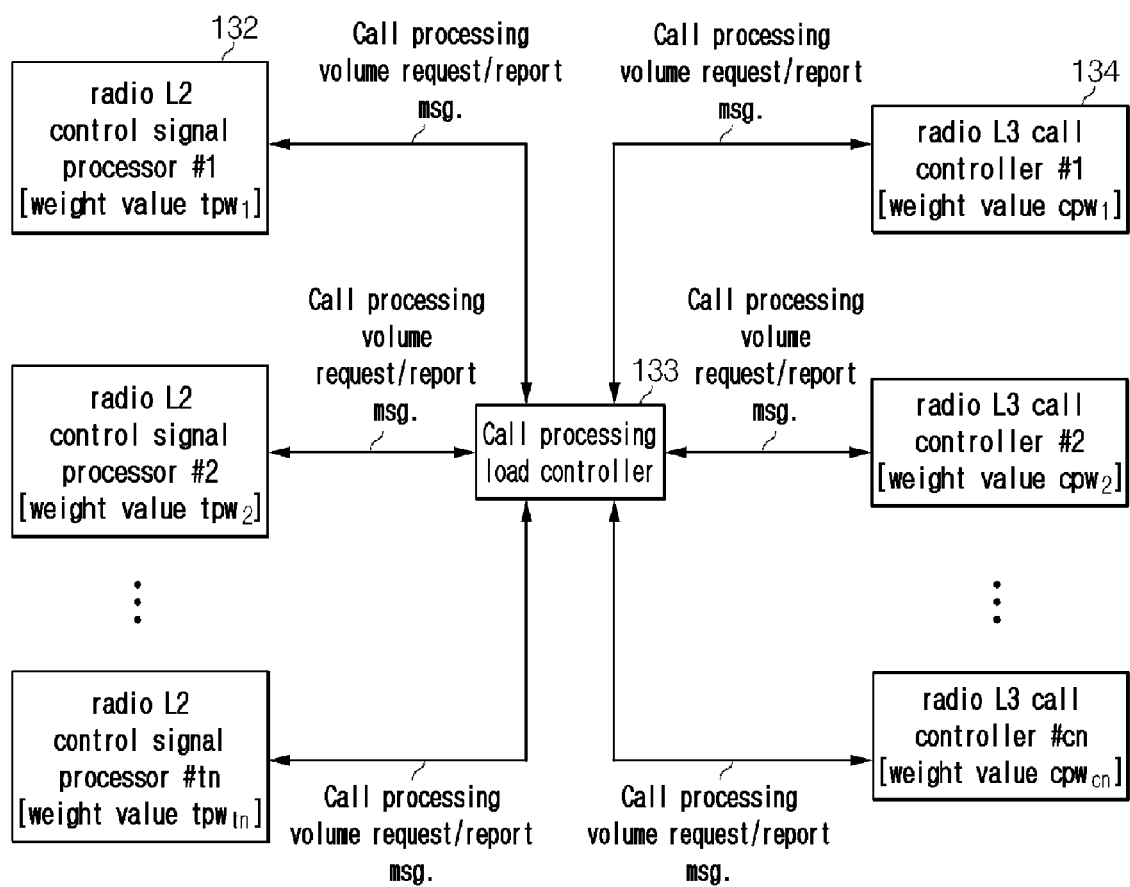
FIG. 5 is a functional block diagram illustrating a configuration of the call process load controller and call process volume request/report message in the CS of the RAN according to the embodiment of the present invention.

FIG. 5 depicts a call process load rate control functionality of the call process load controller 133 for the call processor 134 and the traffic signal processor 132 in the CS 130 of the RAN according to an embodiment of the present invention.

As shown therein, the call process load controller 133, the call processor 134, and the traffic signal processor 132 send and receive call process information including call process volume report/request messages.

In particular, the call process volume report message sent to the call process load controller 133 from the traffic signal processor 132 and the call processor 134 includes call process information on control signal channels and traffic signal channels which are in connection, set, or currently being processed. The load rate of the call process is measured based on a total volume of call process and a QoS-based class-specific call process volume, and these measures are included in the call process information.

The call process volume report message may include one of weight values of hardware and software performance, or may include both. However, the call process volume report message may not include such information in the case that the call process load controller 133 is aware of the weight values of the respective devices in advance. In other words, information on the weight value of the respective devices are sent to the call process load controller 133 when the devices are initially installed and thus the call process load controller 133 manages the information on the weight values of the respective devices.

The call process load controller 133 which has received the call process volume report message estimates load rate of the respective devices by using the call process information, and registers an estimated value to a list of call process load rates.

Herein, the load rate of the call process varies depending on whether the device is the call processor 134 or the traffic signal processor 132. The load rate of the call process is divided into a total load rate of call control process LRcp(i) for a call processor i, a QoS-based class-specific load rate of call control process QLRcp(i, j) for a currently processing QoS class j, a total load rate of a traffic control process LRtp(i) for a random traffic signal processor i, and a QoS-based class-specific load rate of traffic control process QLRtp(i, j) for the currently processing QoS class j.

These load rates of call control process are estimated depending on the devices as follows.

A load rate of a call control processor (hereinafter, referred to as LRcp) for a random call processor i is calculated as in Equation 1.

$$LRcp(i) = \frac{1}{NWFIcp(i)} \times \frac{CallPcVolume(i)}{TotalCallPcVolume} \quad \text{[Equation 1]}$$

where i=1, 2, . . . , cn (cn denotes a total number of call processors), CallPcVolume(i) denotes a total volume of call control processes of the call processor i, and TotalCallPcVolume denotes a total volume of call control processes assigned to all call processors.

In addition, NWFIcp(i) denotes the weight value of the call processor corresponding to the maximum weight value estimated in accordance with performance of a total call processor. In other words, NWFIcp(i (i) represents a normalized weighting fairness index for a call control processor (hereinafter referred to as NWFIcp), and this value guarantees fairness of the weight values of the call processor i for the respective call processors. The NWFIcp(i) is given as in Equation 2.

$$NWFIcp(i) = cpw_i/cpw_{max} \quad \text{[Equation 2]}$$

where cpwI denotes the weight value of the call processor i, and cpwMAX denotes the maximum weight value of a call processor with the highest performance capability among other weight values of the respective call processors. cpwMAX is given as in Equation 3.

$$cpw_{MAX} = \max\{cpw_1, cpw_2, \ldots, cpw_{cn}\} \quad \text{[Equation 3]}$$

Regarding a random call processor i, QLRcp(i,j) which denotes a QoS-based class-specific load rate of a call control processor (hereinafter referred to as QLRcp) for a currently processing QoS class j is calculated as in Equation 4.

$$QLRcp(i, j) = \frac{1}{NWFIcp(i)} \times \frac{QbasedClassCallPcVolume(i, j)}{TotalQbasedClassCallPcVolume(j)} \quad \text{[Equation 4]}$$

where j denotes each QoS class (j=1, 2, , , , , k, and k is a total number of QoS classes defined by mobile communication service classes), QbasedClassCallPcVolume(i, j) and Total/basedClassCallPcVolume(i, j) respectively denote a call process volume for the QoS-based class j currently processed by the call processor i and the sum of a total volume of call processes for the QoS-based class j assigned to all call processors.

As described, the LRcp(i) and the QLRcp(i) of the random call processor i calculated through Equation 1 and Equation 4 are registered in the list of call processing load rates of the list of load rate of call processor.

In addition, a total load rate of a traffic processor (hereinafter referred to as LRtp) LRtp(i) is calculated through Equation 5.

$$LRtp(i) = \frac{1}{NWFItp(i)} \times \frac{TrafficPcVolume(i)}{TotalTrafficPcVolume} \quad \text{[Equation 5]}$$

where i=1, 2, . . . , th (th is a total number of traffic signal processors), TrafficPcVolume(i) denotes a total volume of traffic processes included in a report message indicating a total volume of traffic signals processed by a traffic signal processor i, and TotalTrafficPcVolume denotes the sum of total volume of processed traffic signals corresponding to total calls of the CS currently assigned to the total traffic signal processors.

Further, NWFItp(i) denotes a weight value of the traffic signal processor i corresponding to the maximum weight value according to performance of the total traffic signal processors. In other words, NWFItp(i) refers to a normalized Weighting Fairness Index of traffic processors (hereinafter, referred to as NWFItp), and this value guarantees fairness of the weight values of the traffic signal processor I, and is calculated through Equation 6.

$$NWFItp(i) = tpw_i/tpw_{MAX} \quad \text{[Equation 6]}$$

where tpwI denotes a weight value of the traffic signal processor i according to its performance, and tpwMAX denotes the maximum weight value among the respective traffic signal processors according to their performance. The tpwMAX is calculated through Equation 7.

$$tpw_{MAX} = \max\{tpw_1, tpw_2, \ldots tpw_{tn}\} \quad \text{[Equation 7]}$$

Regarding a random traffic signal processor i, a QLRtp(i,j) which denotes a QoS-based class-specific load rate of call control processor (hereinafter referred to as QLRcp) for the currently processing QoS class j is calculated as shown in Equation 8.

$$QLRtp(i, j) = \frac{1}{NWFItp(i)} \times \frac{QbasedClassTrafficPcVolume(i, j)}{TotalQbasedClassTrafficPcVolume(j)} \quad \text{[Equation 8]}$$

where j denotes each QoS class (j=1, 2, , , , , k and k is the total number of QoS classes defined by the mobile communication service classes), and QbasedClassTrafficPcVolume(i, j) and TotalQbasedClassTrafficPcVolume(j) respectively denote a call process volume for the QoS-based class j currently processed by the call processor i and the sum of a total volume of call processes for the QoS-based class j assigned to all call processors.

As described, the load rate of the traffic process LRtp(i) and the QoS-based class load rate of traffic process QLRcp(i,j), calculated through Equations 5 and 8, are registered in a load rate list of traffic signal processors in the load rate list of the call processes.

With reference to FIG. 6 to FIG. 13, a functionality of the call process load controller 133 according to an embodiment of the present invention will be described in detail.

Figure 6:
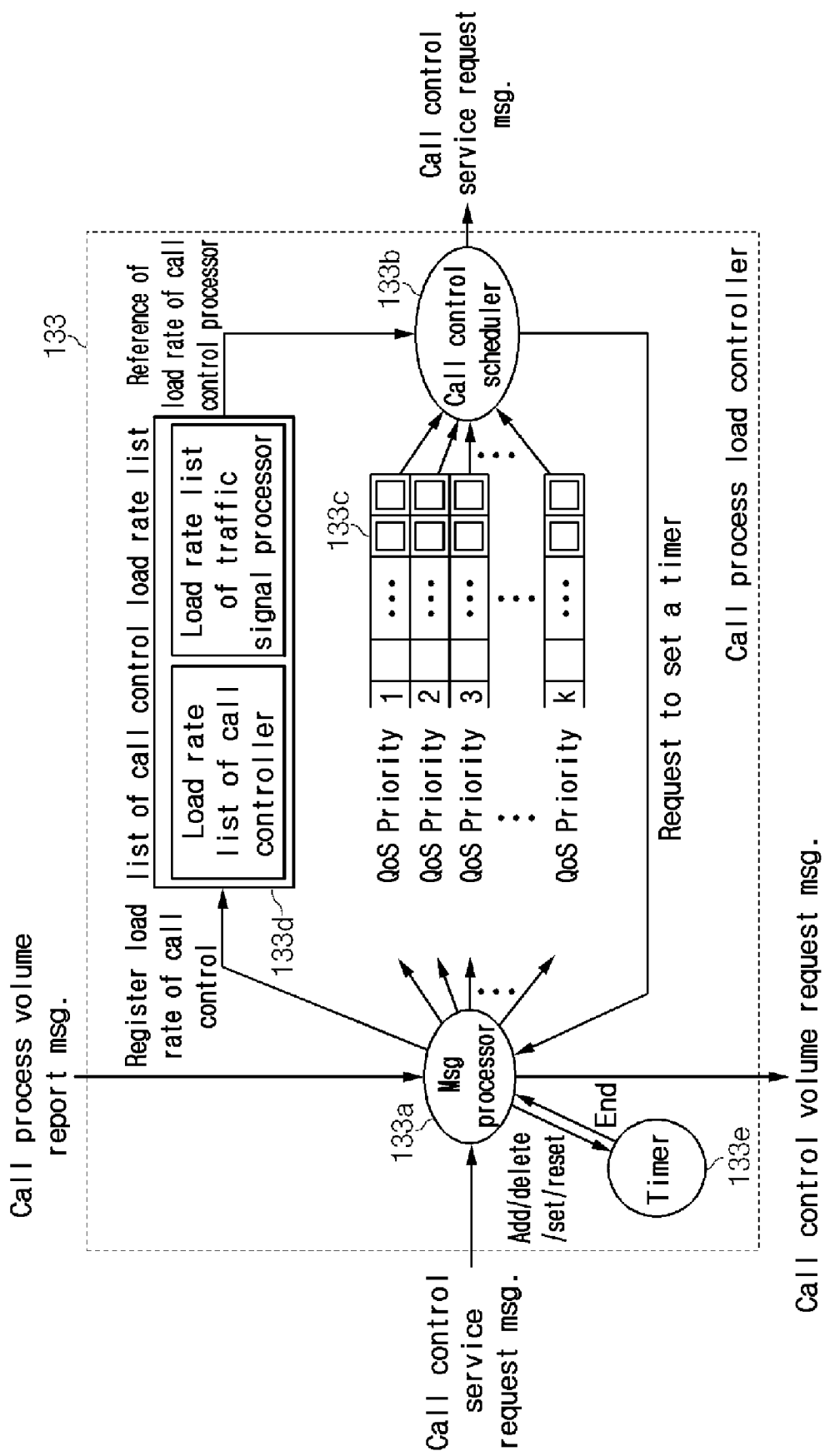
FIG. 6 shows a configuration of the call process load controller according to the embodiment of the present invention.

FIG. 6 depicts a configuration of the call process load controller 133 according to the embodiment of the present invention.

As shown therein, the call process load controller 133 according to the present invention includes a message processor 133a, a call control scheduler 133b, a priority-based message class queue 133c, a list of call processing load rates 133d, and a timer 133e.

Figure 7:
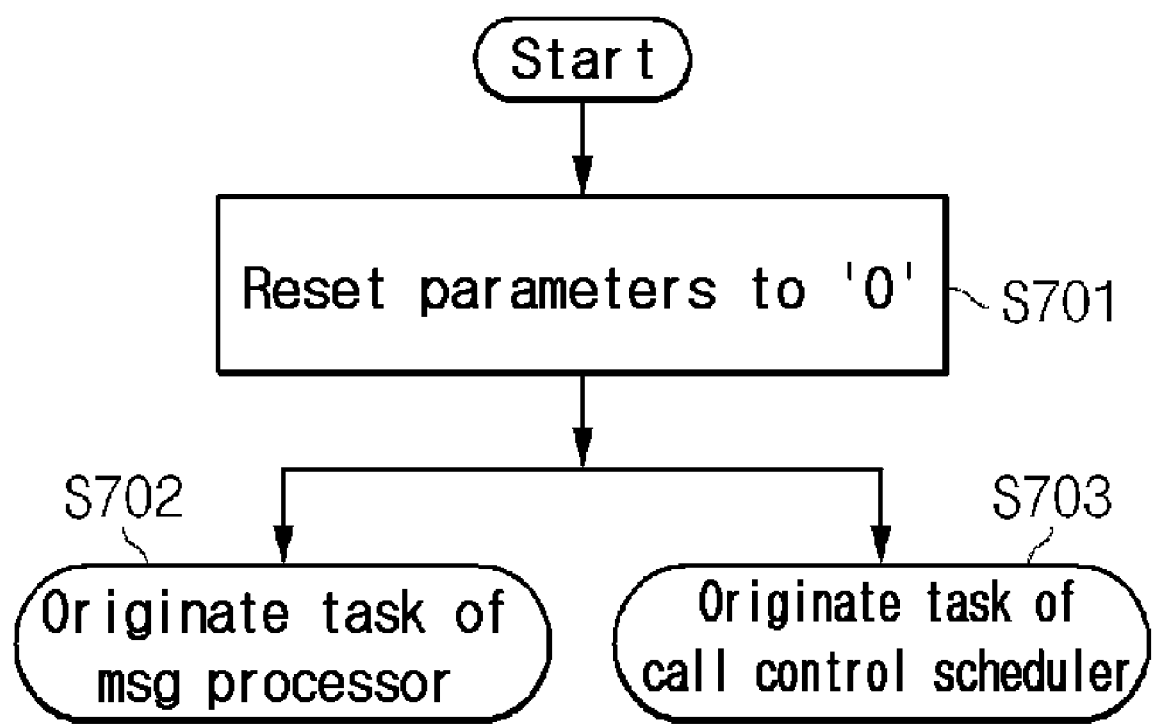
FIG. 7 is a flow chart illustrating starts of tasks of a message processor of the call process load controller and a call control scheduler according to the embodiment of the present invention.

FIG. 7 shows a flow chart illustrating a process of the message processor 133a and the call control scheduler 133b of the call process load controller 133 according to the embodiment of the present invention.

As shown in FIG. 7, the call process load controller 133 according to the present invention initializes parameters of a call process load rate of the list of call processing load rates 133d and a period of the timer 133e to be '0' for call process distribution and control in step S701.

Permanent and independent tasks for the message processor 133a and the call control scheduler 133b are generated in steps S702 and S703.

An operation of the message processor 133a according to the embodiment of the present invention will be described hereinafter.

The message processor 133a according to the present invention processes a call control service request message sent from the MS 110 and the CN 150, a queue control request message sent to the call control scheduler 133b for processing the received call control service request, an internal control message requesting termination of the timer 133e for a plurality of call processors 134 or a plurality of traffic signal processors 132, a request message for setting the timer 133e sent from the call control scheduler 133b to internally control the timer 133e to be set for the plurality of call processors 134 and the plurality of traffic signal processors 132, a call process volume report message from the call processors 134 and the traffic signal processors 132, and an external control message corresponding to requests from the call processors 134 and the traffic signal processors 132.

In addition, the message processor 133a generates/deletes/sets the timer 133e, calculates a fair call process volume referring to the call process report messages from the plurality of call processors 134, and registers a calculated value to the list of call processing load rates 133d.

Figure 8:
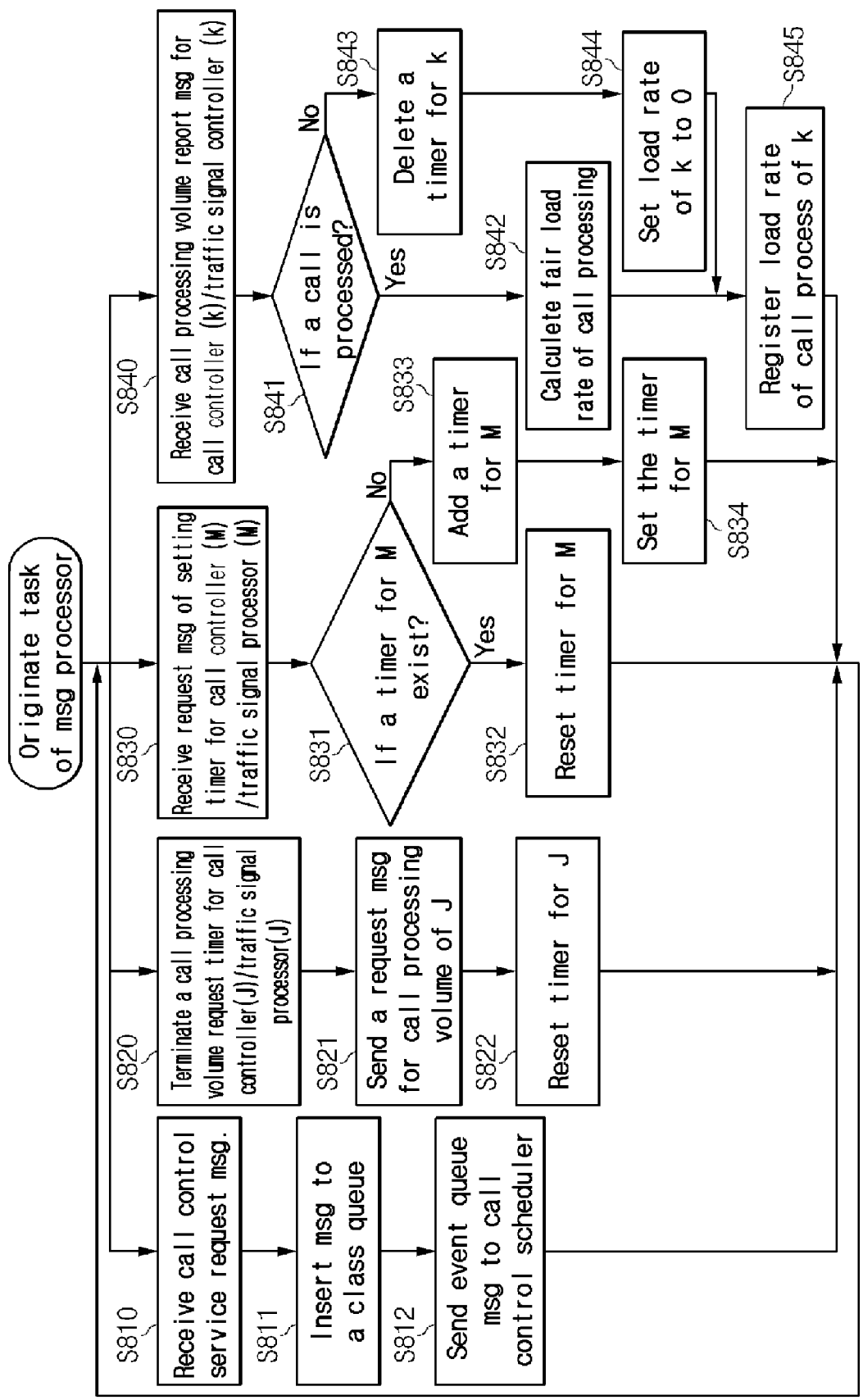
FIG. 8 is an operational flow chart of the message processor according to the embodiment of the present invention.

FIG. 8 shows an operational process of the message processor 133a according to an embodiment of the present invention.

As shown therein, the message processor 133a according to the embodiment of the present invention checks whether the switch network 140 receives the call control service request message from the MS 110 or the CN 150, and checks whether the switch network 140 receives the internal control message for termination of the timer 133e for requesting a call process volume of a plurality of call processors 134. The message processor 133a also checks whether the switch network 140 receives the request message for setting the timer 133e from the call control scheduler 133b for the call processor 134 or the traffic signal processors 132, and checks whether the switch network 140 receives the call process volume request message from the call processors 134 through steps S810 to S840.

Herein, once the message processor 133a receives the call control service request message in step S810, the message processor 133a inserts a message queue to the queue class according to a priority of the message in step S811 and returns to a message waiting state after sending a queue event internal message to the call control scheduler 133b.

When the message processor 133a receives an internal message in consequence of termination of the timer requesting the call process volume for a random call processor J or a traffic processor J in step S820, the message processor 133a sends the call process volume request message to the random call processor J or the traffic processor J in step S821, and returns to the message waiting state after resetting the timer for the call processor and the traffic processor.

Once the message processor 133a receives a timer setting request message at the call processor M or a traffic processor M from the call control scheduler 133b in step S830, the message processor 133a checks existence of a timer set for the call processor M or the traffic processor M in step S831 and resets the timer for the call processor M in step S832. After that, the message processor 133a returns to the message waiting state.

In the case that the timer does not exist in step S831, the message processor 133a adds a new timer and sets the timer for the call processor M or the traffic processor M in steps S833 and S844, and the message processor 133a returns to the message waiting state.

When the message processor 133a periodically receives a call control process volume request message from a call processor K or a traffic processor K in step S840, the message processor 133a checks the number of calls processed by the call processor K or the traffic processor K which sent the request message, in step S841. In the case that no call has been processed, the timer set for the call processor K or the traffic processor K is deleted in step S843, a load rate of call control processes is set to be 0 in step S844, and the load rate of the call control processes is registered in the list of all processing load rates 133d in step S845. After that, the message processor 133a returns to the message waiting state.

However, in the case that a call is processed, the message processor 133a calculates a load rate of the call control processes for the call processor K or the traffic processor K and a weight value of the call processor K or the traffic processor K in step S842, the message processor 133a registers a calculation result in the list of call processing load rates 133d in step S842 and returns to the message waiting state.

Herein, a LRcp(k), a QLRcp(k, j), a LRtp(k), and a QLRtp (k, j) for the call processor K are calculated through the foregoing Equations 1, 4, 5, and 8. An operational process for the call control scheduler 133b according to an embodiment of the present invention will be described hereinafter.

The call control scheduler 133b according to the embodiment of the present invention selects an available device which has the minimum load rate of call processes from among a plurality of call processors and a plurality of traffic processors respectively having fairly calculated load rates of call processes in the list of all processing load rates 133d in accordance with a priority of the call control service request message. The selected device receives the call control service request message from the call control scheduler 133b. Such an operation of the call control scheduler 133b responds to the call control request message according to priority, and the load rates of call control processes of the respective call processors and the respective traffic signal processors are fairly calculated in accordance with their weight values.

Figure 9:
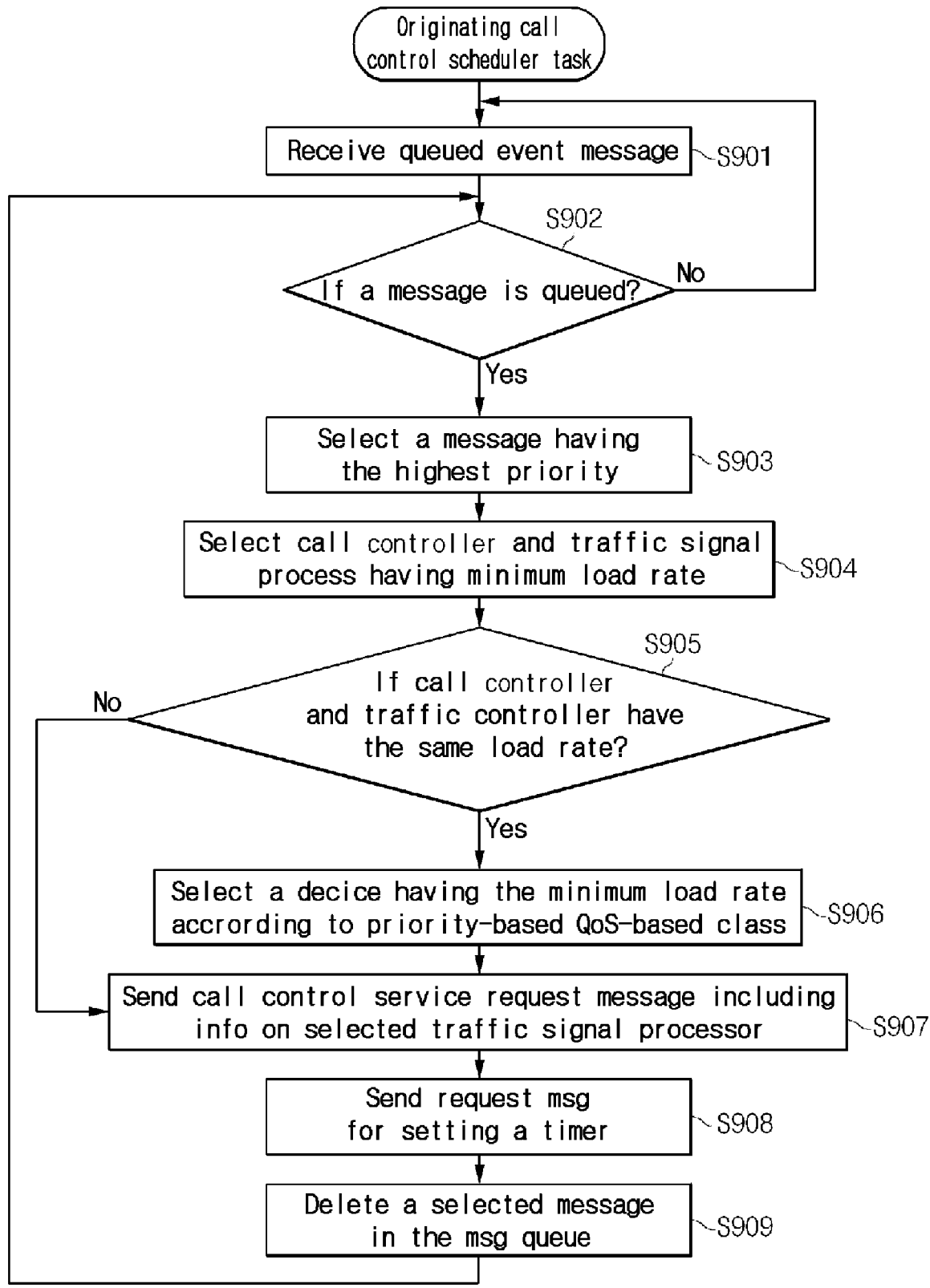
FIG. 9 is an operational flow chart of the call control scheduler according to the embodiment of the present invention.

FIG. 9 shows a flow chart explaining an operation of the call control scheduler 133b according to an embodiment of the present invention.

As shown therein, the call control scheduler 133b according to the embodiment of the present invention receives a queue event internal message from the message processor 133a in step S901, and checks whether more than one message is queued in step S902.

In the case that no message is queued, the call control scheduler 133b returns to a message waiting state and waits until a queue event internal message is sent from the message processor 133a. However, when more than one message is queued, the call control scheduler 133*b* selects a message having the highest priority from among the queued messages in step S902, and selects a call processor 134 and a traffic signal processor 132 to which the selected message is to be sent with reference to load rates of the call control process of the call processor 134 and the traffic signal processor 132 in step S904.

Herein, the call control scheduler 133*b* selects an available call processor and an available traffic signal processor. The selected call processor has the minimum load rate of call control process LRcp(i) among the plurality of call control processors in the list of call processing load rates 133*d* as a result of the Equation 1, and the selected traffic signal processor has the minimum load rate of traffic signal processes among the plurality of traffic signal processors in the load rate list of traffic signal processors of the list of call processing load rates 133*d* as a result of the Equation 5.

In the case that the call processor and the traffic signal processor are plurally selected, the call control scheduler 133*b* selects a call processor and a traffic signal processor which have the minimum load rates for a message included in the highest QoS class. In other words, the call control scheduler 133*b* selects the call processor and the traffic signal processor which have the minimum QLRcp(i, j) or the minimum QLRtp(i,j). Herein, in the case the call processor controller and the traffic signal processor are plurally selected again, the call control scheduler 133*b* selects a call processor and a traffic signal processor which have the minimum load rate for a message included in the next highest QoS class. In the case that the call processor and the traffic signal processor having the minimal load rate for the message in the lowest QoS, the call control scheduler 133*b* randomly selects a call processor and a traffic signal processor in steps S905 and S906.

As described, after selecting the call processor, the call control scheduler 133*b* sends a call control service request message in the message queue to the selected call processor 134 in step S607. The call control service request message sent to the call processor 134 contains information on the selected traffic signal processor. The call control scheduler 133*b* sends a request message for setting a timer for the call processor 134 to the message processor 133*a* in step S908, and deletes the selected queue from the message queue in step S909.

The call control scheduler 133*b* returns to checking the number of queued message in the message queue (step S902), and repeats the steps S903 to S909.

Hereafter, an operation of the call processor 134 according to an embodiment of the present invention will be described in detail.

Figure 10:
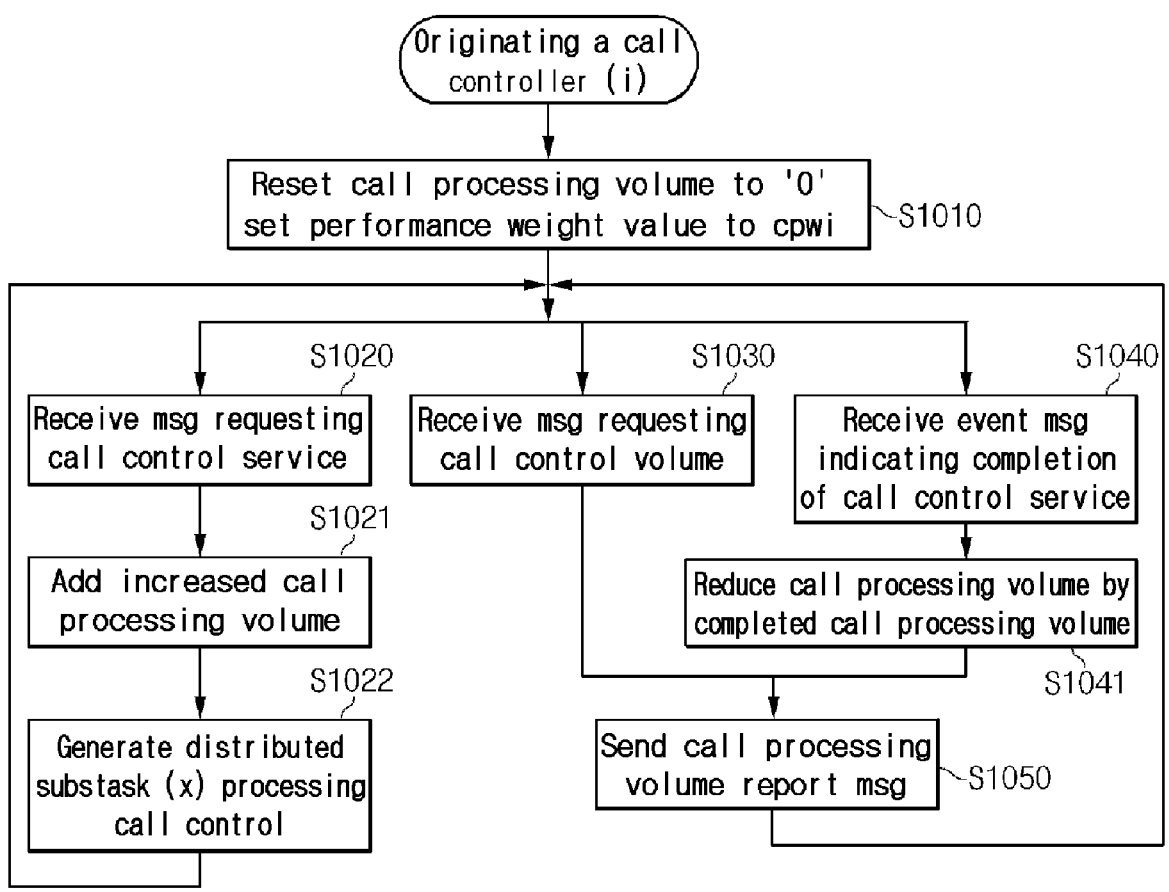
FIG. 10 and FIG. 11 are operation flow charts of the call processor according to the embodiment of the present invention.

FIG. 10 is an operational flow chart of the call processor 134 according to the embodiment of the present invention.

As shown therein, the call processor 134 according to the embodiment of the present invention initializes weight values in accordance with performance of the respective devices when a system is activated, in step S1010.

After initialization, the call processor 134 receives a call control service request message and a call control process volume request message from the call process load controller 133 in steps S1020 and S1030, and receives an internal control message triggering an event for completion of call control service from an independent call processor subtask performing a series of tasks in the call processor in step S1040.

Herein, the call processor 134 which has received the call control service request message from the call process load controller 133 adds an increased call process volume in step S1021, and generates an independent call processor subtask x to process the call control service request message in step S1022. After that, the call processor 134 returns to the message waiting state.

When the call processor 134 periodically or randomly receives the call process volume message from the call process load controller 133 in step S1030, the call processor 134 sends a call process volume report message to the call process load controller 133 in step of S1050 and returns to the message waiting state. The call process volume report message includes a currently accumulated total volume of call processes, a QoS-based class call process volume, and an initial weight value of the call processor 134.

Once the call processor 134 receives an event message for completion of the call control service from the independent call control processor subtask x in step S1040, the call processor 134 subtracts a processed call volume from the volume of calls to be processed in step S1041, and sends the call process volume report message to the call process load controller 133 in step S1050. After that, the call processor 134 returns to the message waiting state. Herein, the call process volume report message sent to the call process load controller 133 includes a currently accumulated total volume of call processes, a QoS-based class call process volume, and a weight value of an associated the call processor.

Figure 11:
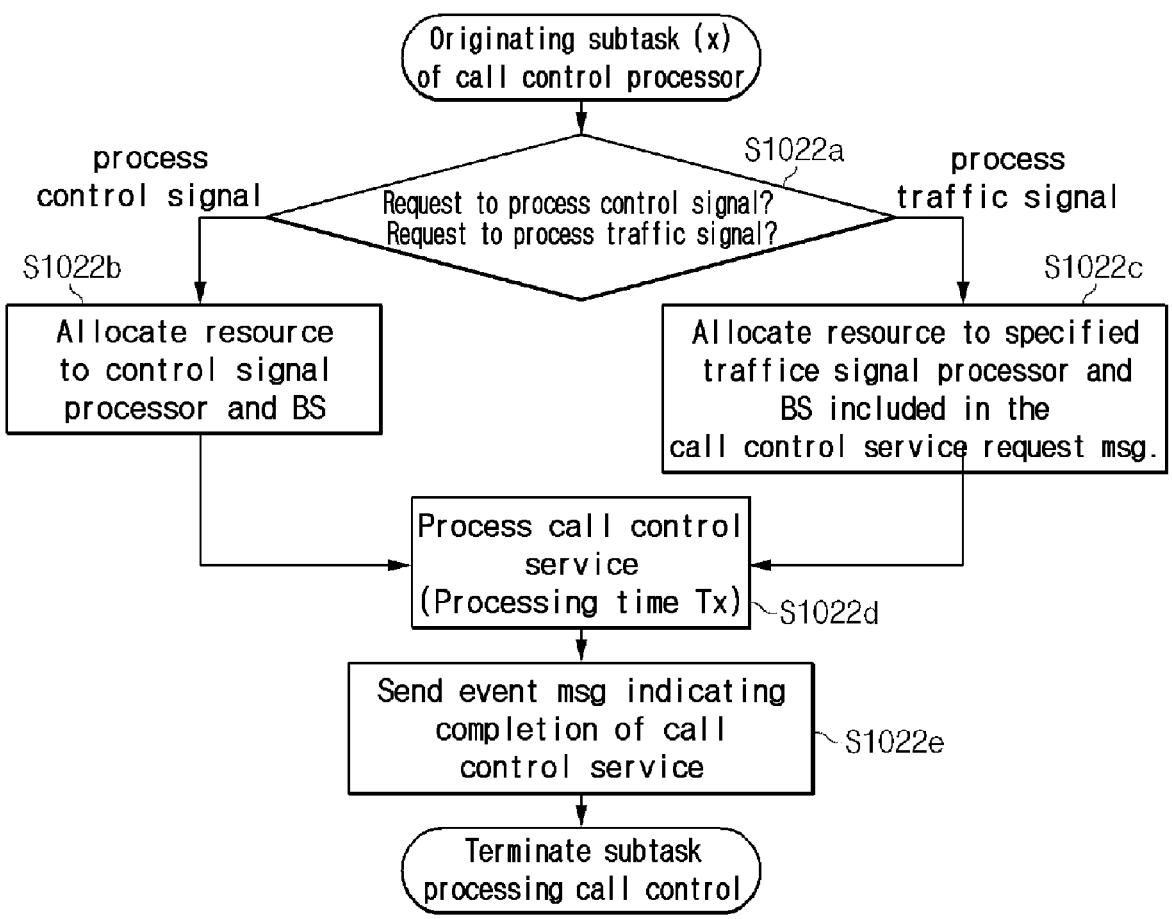

FIG. 11 illustrates an operational flow of the call control processor subtask x according to an embodiment of the present invention.

As shown therein, the call control processor subtask x distributes a call control service corresponding to the call control service request message in step S1022*a*, and allocates resources according to characteristics of the message. Thus, the call control process subtask x allocates the resources to an associated control signal processor and an associated BS in the case that the message requires control signals to be processed in step S1022*b*, and allocates the resources to a predetermined traffic signal processor and a predetermined BS in the case that the message requires traffic signals to be processed, in step S1022*c*. Herein, information on the predetermined traffic signal processor and the BS are included in the call control service request message.

The respective call control services are processed during a random period of time in step S1022*d*, and the call processor subtask x is terminated when the task is completed and the call control service completion event message is immediately sent in step S1022*e*.

Hereinafter, an operational flow of the traffic signal processor 132 according to an embodiment of the present invention will be described in detail.

Figure 12:
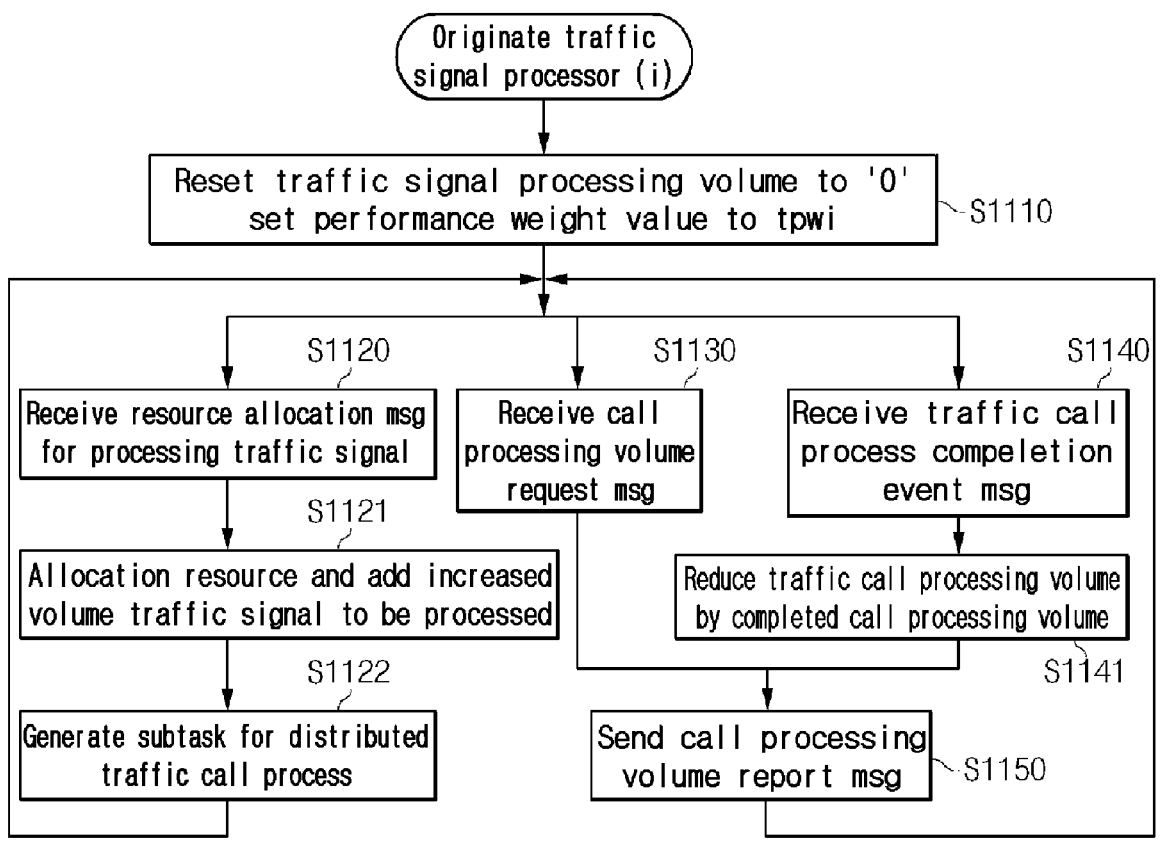
FIG. 12 and FIG. 13 are operational flow charts of the traffic signal processor according to the embodiment of the present invention.

As shown in FIG. 12, a plurality of traffic signal processors 132 according to the present invention initialize weight values according to their performance in step S1110. The weight values may be the same or different from each other.

The plurality of traffic signal processors 132 receive a resource allocation request message and a call control process volume message from the call process load controller 133 in steps S1120 and S1130, and receives a traffic call process completion event message from an independent traffic signal process distribution subtask t performing a series of tasks in the traffic signal processor 132 in step S140.

Herein, the traffic signal processor 132 which has received the resource allocation request message for processing the traffic signals from the call process load controller 133 adds allocated resources and an increased volume of processed traffic signals in step S1121, and generates the independent traffic signal process distribution subtask t to process the resource allocation for processing the traffic calls in response to the request message in step S1122. After that, the traffic signal processor 132 returns to the message waiting state.

When the traffic signal processor 132 periodically or randomly receives a call process volume request message from the call process load controller 133 in step S1130, the traffic signal processor 132 sends a call process volume report message to the call process load controller 133 in step S1150 and returns to the message waiting state. The call process volume report message includes a currently accumulated total volume of call processes, a QoS-based class call process volume, and an initial weight value of the corresponding traffic signal processor 132.

Once the traffic signal processor 132 receives a call control service completion event message from the independent traffic signal process distribution subtask t in step S1140, the traffic signal processor 132 subtracts the volume of processed traffic calls from the volume of traffic calls to be processed in step S1141, and sends the call process volume report message to the call process load controller 133 in step S1150. After that, the call processor 133 returns to the message waiting state. Herein, the call process volume report message sent to the call process load controller 133 includes a currently accumulated total volume of call processes, a QoS-based class call process volume, and a weight value of the corresponding the traffic signal processor.

Figure 13:
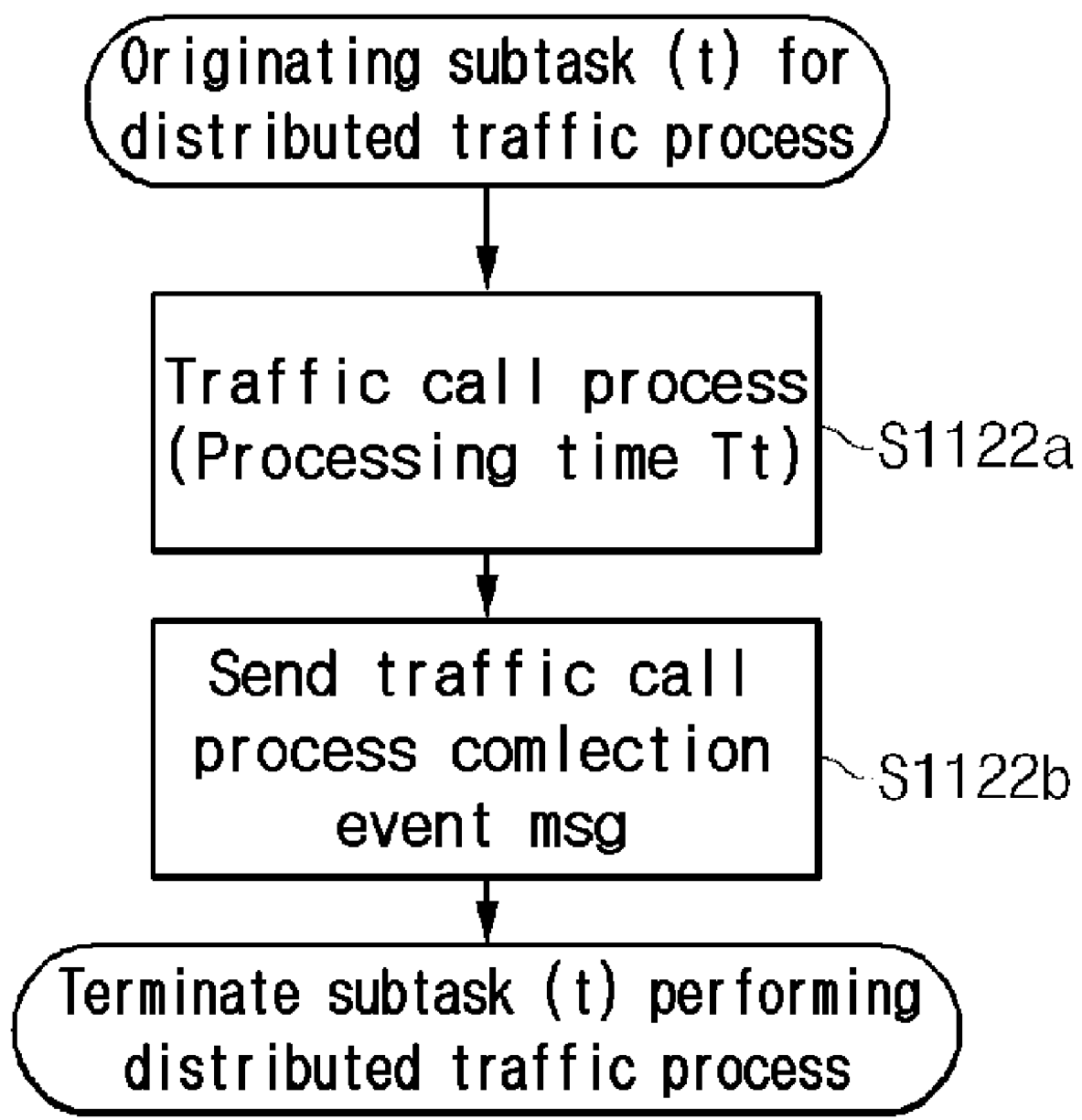

FIG. 13 shows an operational flow of the traffic signal process distribution subtask t according to an embodiment of the present invention.

As shown therein, the traffic signal process distribution subtask t according to the embodiment of the present invention processes corresponding traffic calls for the randomly requested traffic call services for a random period of time in step S1122a, and the traffic signal process distribution subtask t is terminated when the task is completed and thus the traffic call control service completion event message is immediately sent in step S1122e.

Figure 14:
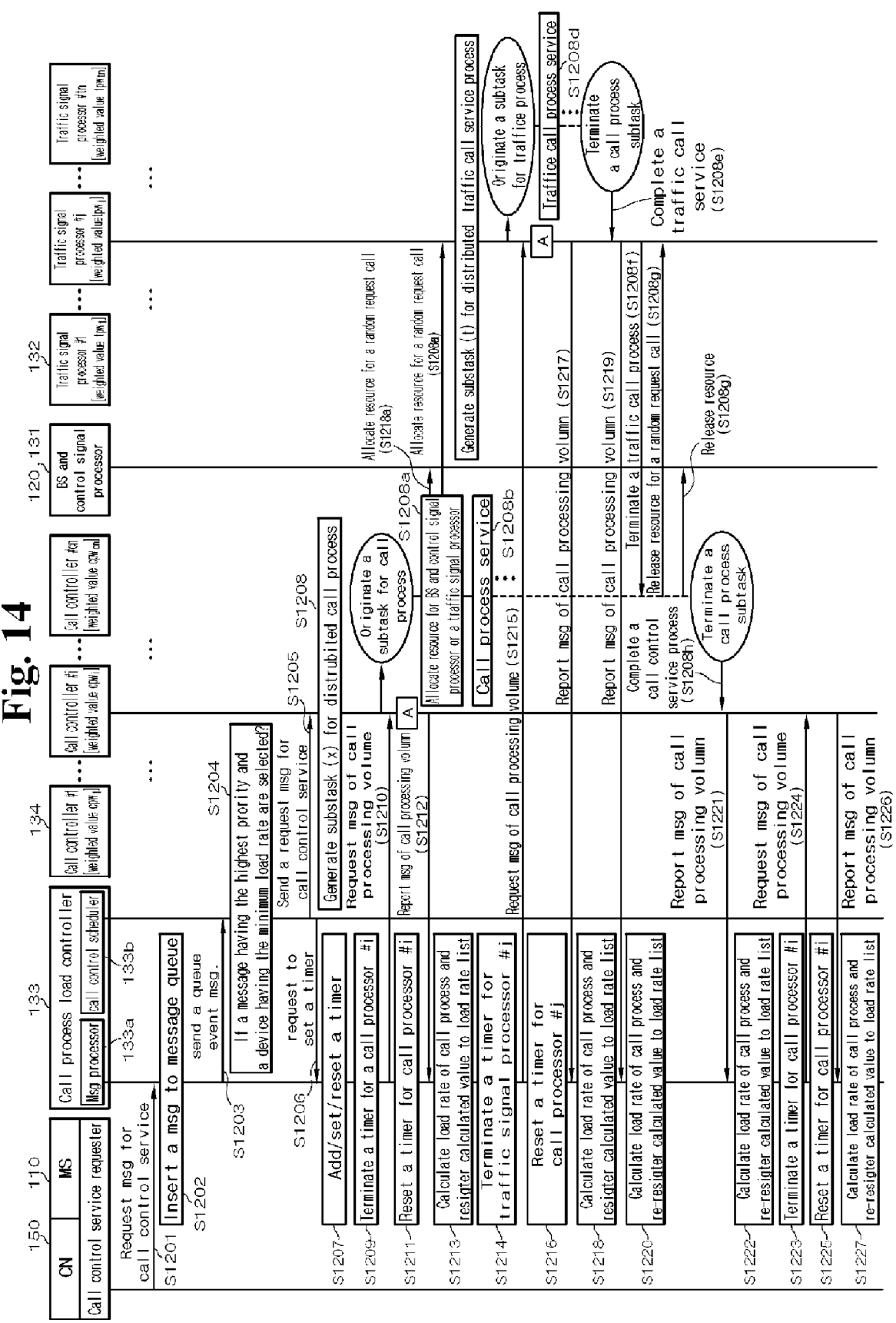
FIG. 14 shows the whole flow of the RAN according to the embodiment of the present invention.

FIG. 14 depicts operational flows between the respective devices in accordance with messages in the RAN according to the embodiment of the present invention.

As shown therein, when call control service requesters of the CN 150 or the MS 110 send a call control service request message to the call process load controller 133, the message processor 133a of the call processor 133 receives the message and inserts the message into the priority-based message queue class. After that, the message processor 133a sends a queue event internal message to the call control scheduler 133b through steps S1201 to S1203.

The call control scheduler 133b which has received the queue event internal message selects a message having the highest priority in the message queue class, and selects a call processor 134 and a traffic signal processor 132 which have the minimum load rate referring to the list of call processing load rates in step S1204. The call control scheduler 133b sends the call control service request message to the selected call processor 134 in step 1205, and requests to set timers for the selected call processor 134 and the traffic signal processor 132 in step S1206.

The message processor 133a adds, sets, and resets the timers according to existence of the timer set for the corresponding device in step S1207. At the same time, the selected call processor 133 generates an independent performance distribution subtask x to independently perform call processes in step S1208.

When the timer set for the call processor 134 is terminated in step S1209, and the message processor 133a sends a call process volume request message to the call processor and resets the timer in steps S1210 and S1211.

The call processor 134 which has received the call process volume request message sends a call process volume report message to the message processor 133a in step S1212, and the message processor 133a receives the call process volume report message and calculates a load rate of call processes and registers a calculated result to the load rate list in S1213.

The independent performance distribution subtask x allocates resources to the BS and the control signal processor 131 or the traffic signal processor 132 in step S1208a, performs the corresponding call process services in step S1208b, generates a subtask t for distribution of traffic call processes, and performs the corresponding traffic call process service in steps S1208c and S1208d.

Once the subtask t completes the distributed traffic call service process, the subtask t sends a traffic call service process completion message to the traffic signal processor 132 in step S1208e. The traffic signal processor 132 receives the message and releases the resource which has been allocated to the BS 120 and the control signal processor 131 or the traffic signal processor 132, and terminates the call process subtask in steps S1208f and S1208h.

When the timer set for the traffic signal processor 132 is terminated, the message processor 133a sends the call process volume request message to the traffic signal processor 132 and resets the timer through steps S1214 to S1216. The message processor 133a receives the call process volume report message from the traffic signal processor 132, calculates the load rate of call processes, and registers a calculation result to the load rate list in step S1218. The message processor 133a recalculates the load rate of call processes and re-registers the calculation result to the load rate list whenever the call process volume report message is updated to the message processor 133a in steps S1219 and S1220.

The call processor 134 which has received the call control service completion message sends the call process volume report message to the message processor 133a, and the message processor 133a recalculates the load rate of call processes and re-registers the recalculated value to the load rate list in step S1222.

As described, the message processor 133a repeats receiving the call process volume report message, recalculating the load rate of call processes, and re-registering the calculated value to the list until the timer set for the selected call processor 134 is terminated.

Once the timer set for the call processor 134 is terminated, the message processor 133a sends the call process volume request message to the call processor 134, and resets the timer through steps S1124 and S1125, and the call processor 134 receives the call process volume request message and recalculates the load rate of call processes to re-register the recalculated value to the list of load rate of call processes in steps S1126 and S1127.

According to an embodiment of the present invention, the call processor 134 and the traffic signal processor 132 calculate a currently processed call volume by subtracting the volume of processed calls whenever the call processor 134 and the traffic signal processor 132 receive the call process volume request messages, and send the call process volume report message to the message processor 132a. In FIG. 14, a process for calculation of the currently processed call volume of the call processor 134 or the traffic signal processor 132 is marked as A.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described, according to the embodiments of the present invention, a mobile communication system can be stably and efficiently operated by distributing a call processing load to respective devices based on their software and hardware performance, and processing a call control request having highest priority by offering QoS-based classes to thereby reduce delay in processing the earliest call.

The invention claimed is:

1. A mobile communication system having a radio access network including a base station, a control station, and a switch network for matching a mobile station and a core network, the control station comprising:
   a radio layer 2 traffic signal processor (hereinafter, referred to as a traffic signal processor) connected to the base station, sharing radio resources, and processing traffic calls;
   a radio layer 2 control signal processor (hereinafter, referred to as a control signal processor) receiving call control service request messages sent from the mobile station through the base station;
   a call process load controller receiving call control service request messages respectively sent from the mobile station and the core network through the control signal processor, and processing the call control service request messages; and
   a radio layer 3 call processor (hereinafter, referred to as a call processor) distributing and allocating resources for control and traffic calls to the control signal processor, the traffic signal processor, and the base station in accordance with the call control service request messages processed by the call process load controller, wherein
   the call process load controller refers to information on a call process volume included in a call process volume report message sent from the call processor and the traffic signal processor, selects a corresponding call processor and a corresponding traffic signal processor according to weight values of the call processor and the traffic signal processor estimated based on software and hardware performance of the call processor and the traffic signal processor, and sends the call control service request message containing information on the selected traffic signal processor to the selected call processor.

2. The mobile communication system of claim 1, wherein the call process load controller comprises:
   a message processor receiving the call control service request messages sent from the core network and the mobile station via the control signal processor, storing the message in a class queue according to a quality of service-based priority, registering call process volume report messages sent from the call processor and the traffic signal processor in a list of call processing load rates, and controlling timers set for the call processor and the traffic signal processor; and
   a call control scheduler receiving a queued event message from the message processor, selecting a call processor and a traffic signal processor according to priority of the class queue, and sending the call control service request messages to the selected call processor.

3. The mobile communication system of claim 2, wherein the message processor receives a call control request timer termination message for the call processor and the traffic signal processor, sends the call process volume report message to the call processor and the traffic signal processor, and resets the timer.

4. The mobile communication system of claim 2, wherein the message processor receives a set timer request message for the call processor and the traffic signal processor, and resets the timers or sets new timers for the call processor and the traffic signal processor.

5. The mobile communication system of claim 2, wherein the message processor receives the call process volume report message for the call processor and the traffic signal processor, calculates load rates of call processes for the call processor and the traffic signal processor, and registers calculated load rates to the list of call processing load rates.

6. The mobile communication system of claim 2, wherein the call control scheduler receives the queued event message and selects a message having the highest priority queued in the class queue, and selects a call processor and a traffic signal processor respectively having a minimum load rate for the selected message referring to the list of call processing load rates.

7. The mobile communication system of claim 2, wherein a call processor and a traffic signal processor having a minimum load rate of call processes according to the priority of the QoS-based class when a plurality of call processors and a plurality of traffic signal processors are selected, the plurality of call processors and a plurality of traffic signal processors having the same load rates of call processes with each other.

8. The mobile communication system of claim 1, wherein the call processor receives the call control service request message from the call process load controller, processes the call control service, receives one of the call process volume report message and the call control service process completion message from the call process load controller, and sends a call process volume report message to the call process load controller.

9. The mobile communication system of claim 8, wherein the call processor increases a call process volume by the volume of calls to be processed when the call processor receives the call control service request message from the call process load controller, and reduces the call process volume by the volume of processed calls when it receives the call control service completion message from the call process load controller.

10. The mobile communication system of claim 1, wherein the traffic signal processor receives a resource allocation request message for processing traffic signals from the call process load controller, processes the traffic calls, and sends the call process volume report message to the call process load controller when the traffic signal processor receives one of the call process volume report message and a traffic signal control service completion message from the call process load controller.

11. The mobile communication system of claim 10, wherein the traffic signal processor increases the allocated resource and traffic signal process volume by the volume of traffic calls to be processed when the traffic signal processor receives the resource allocation request message for processing the traffic from the call process load controller, and reduces the traffic call process volume by the volume of processed traffic calls when the traffic signal processor receives the traffic call process completion message from the call process load controller.

12. A method for controlling a load of call processes in a mobile communication system having a radio access network including a base station, a control station (herein, the control station includes a traffic signal processor, a control signal processor, a call process load controller, and a call processor), and a switch network for matching a mobile station and a core network, the method comprising:

a) the call process load controller receiving a call control service request message from the mobile station or the core network;

b) the call process load controller selecting a corresponding call processor and a corresponding traffic signal processor according to weight value of the call processor and the traffic signal processor on the basis of call process volume information included in the call process volume request message sent to the call process load controller;

c) the call process load controller sending the call control service request message to the selected call processor, wherein the call control service request message comprises information on the selected traffic signal processor; and d) the selected call processor which has received the call control service request message allocating resources to the base station, the control signal processor, and the selected traffic signal processor and processing the corresponding call control service.

13. The method of claim 12, wherein in b), the call process load controller comprises:

i) a message processor of the call process load controller inserting the call process volume request message in a queue class according to a priority of the message, and sending a queued event message to a call control scheduler of the call process load controller, and ii) the call control scheduler of the call process load controller selecting the corresponding call processor and the corresponding traffic signal processor selecting a message having the highest priority in the message queue, and selecting a call processor and a traffic signal processor having the minimum load rate referring to a list of call processing load rate storing load rates of call processes of the respective call processors and the traffic signal processors.

14. The method of claim 12, wherein in c), the call process load controller sending the call control service request message to the selected call processor comprises:

the call control scheduler sending a set timer request message to the message processor to set timers for the selected call processor and the selected traffic signal processor and deleting the message selected from the message queue; and the message processor which has received the set timer request message checking existence of the timer set for the selected call processor and the selected traffic signal processor, and resetting the timer or adding a timer depending on the existence of the timer.

15. The method of claim 14, wherein when the timers set for the call processor and the traffic signal processor are terminated, the message processor of the call process load controller sends a call process volume request message to the call processor and the traffic signal processor and resets the timers for the call processor and the traffic signal processor.

16. The method of claim 12, wherein in d), the selected call processor:

i) receives the call control service request message;

ii) increases the volume of calls to be processed by the volume of calls requested to be processed;

iii) divides the received messages into a control signal process request message and a traffic signal process request message, and allocates resources to one of the control signal processor and the selected traffic signal processor according to the division; and iv) processes the call control service for a predetermined period of time, releases the resources allocated to the base station and the control signal processor, and sends a call control service termination event internal message.

17. The method of claim 16, wherein in c) the call comprises:

i-1) the traffic signal processor allocated with the resource by the call processor adding the allocated resource and an increased volume of processed traffic signals; and i-2) the traffic signal processor processing the traffic calls during the predetermined period of time, and sending the traffic call process completion event internal message.

18. The method of claim 17, wherein after i-2), the method further comprises:

the traffic signal processor which has received the traffic call process completion event internal message subtracting the completed traffic process volume from a total volume of traffic call processes, sending a call process volume report message to the call process load controller, and sending the traffic call process completion message to the call processor;

the call processor which has received the traffic call process completion message releasing the resource allocated to the traffic signal processor; and the message processor of the call process load controller which has received the call process volume report message calculating a load rate of call processes for the traffic signal processor and registering the calculated load rate to the list of call processing load rates.

19. The method of claim 18, wherein a load rate for the number of traffic signal processors comprises a total load rate of traffic signal processor LRtp(i) and a load rate of QoS-based class traffic signal process QLRtp(i) for a currently processed QoS class j, the QLRtp(i) being calculated through the following equation:

$$QLRtp(i, j) = \frac{1}{NWFltp(i)} \times \frac{QbasedClassTrafficPcVolume(i, j)}{TotalQbasedClassTrafficPcVolume(j)}$$

where j denotes each QoS class (j=1, 2, , , , , k, and k is a total number of QoS classes defined by mobile communication service classes), NWFltp(i) denotes a weight value of traffic signal processor i corresponding to the maximum weight value according to performance of a total traffic signal processors, and QbasedClassCallPcVolume(i, j) and TotalQbasedClassCallPcVolume(i, j) respectively denote a call process volume for the QoS-based class j currently processed by the call processor i, and the sum of a total volume of call processes for the QoS-based class j assigned to the total call processors.

20. The method of claim 18, wherein the LRtp(i) for the traffic signal processor i is calculated through the following equation:

$$LRtp(i) = \frac{1}{NWFltp(i)} \times \frac{TrafficPcVolume(i)}{TotalTrafficPcVolume}$$

where TrafficPcVolume(i) denotes a total volume of traffic processes included in a report message indicating a total volume of traffic signals processed by a traffic signal processor i, and TotalTrafficPcVolume denotes the sum of total volume of processed traffic signals corresponding to all calls of the control station currently assigned the total traffic signal processors.

21. The method of claim 18, wherein the call process load controller which has the call process volume report message checks the number of processed calls for the call processor and the traffic signal processor, and deletes the timer set for one of the call processor and the traffic signal processor, sets the load rate to be '0', and registers the load rate to the list of call processing load rates when no call has been processed.

22. The method of claim 16, wherein after iv), the method further comprises:
the call processor which has received the call control service process completion event internal message subtracting the volume of processed calls from the total call process volume and sending a call process volume report message to the call process load controller; and
the message processor of the call process load controller which has received the call process volume report message calculating a load rate of the call processor and registering the calculated load rate to the list of call processing load rates.

23. The method of claim 22, wherein a load rate of call processes for the number of call processors comprises a total call process volume LRcp(i) and a QoS-based class load rate of call process QLRcp(i, j) for a currently processed QoS class j, and the QLRcp(i, j) is calculated through the following equation:

$$QLRcp(i, j) = \frac{1}{NWFIcp(i)} \times \frac{QbasedClassCallPcVolume(i, j)}{TotalQbasedClassCallPcVolume(j)}$$

where j denotes each QoS class (j=1, 2, , , , , k, and k is a total number of QoS classes defined by mobile communication service classes), NWFIcp(i) denotes a weight value of call processor i corresponding to the maximum weight value according to performance of all call processors, and QbasedClassCallPcVolume(i, j) and TotalQbasedClassCallPcVolume(i, j) respectively denote a call process volume for the QoS-based class j currently processed by the call processor i, and the sum of a total volume of call processes for the QoS-based class j assigned to all call processors.

24. The method of claim 22, wherein a total load rate of call processes LRcp(i) for the call processor is calculated through the following equation:

$$LRcp(i) = \frac{1}{NWFIcp(i)} \times \frac{CallPcVolume(i)}{TotalCallPcVolume}$$

where CallPcVolume(i) denotes a total call process volume of the call processor i, and TotalCallPcVolume denotes the sum of a total call process volume assigned to the respective call processors.

* * * * *